United States Patent
Ogawa

(10) Patent No.: US 8,865,256 B2
(45) Date of Patent: Oct. 21, 2014

(54) TIRE SURFACE PRINTING METHOD AND TIRE PRINTING DEVICE

(75) Inventor: Yuichiro Ogawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/878,715

(22) PCT Filed: Oct. 7, 2011

(86) PCT No.: PCT/JP2011/005666
§ 371 (c)(1),
(2), (4) Date: Apr. 10, 2013

(87) PCT Pub. No.: WO2012/063403
PCT Pub. Date: May 18, 2012

(65) Prior Publication Data
US 2013/0186537 A1 Jul. 25, 2013

(30) Foreign Application Priority Data

Nov. 8, 2010 (JP) .................................. 2010-250176

(51) Int. Cl.
*B05D 1/02* (2006.01)
*B60C 13/00* (2006.01)
*B29D 30/72* (2006.01)

(52) U.S. Cl.
CPC ......... *B60C 13/001* (2013.01); *B29D 2030/728* (2013.01)
USPC ........... 427/231; 427/233; 427/261; 427/265; 427/425

(58) Field of Classification Search
USPC ........................ 427/231, 233, 262, 265, 425
See application file for complete search history.

(56) References Cited

FOREIGN PATENT DOCUMENTS

| JP | 59-059277 | * | 4/1984 |
| JP | A 59-59277 | | 4/1984 |
| JP | A 61-131083 | | 6/1986 |
| JP | 04-223142 | * | 8/1992 |
| JP | A 4-223142 | | 8/1992 |
| JP | A 2002-68154 | | 3/2002 |
| JP | A 2002-316502 | | 10/2002 |
| JP | A 2003-311598 | | 11/2003 |
| JP | A 2006-111242 | | 4/2006 |

(Continued)

OTHER PUBLICATIONS

May 14, 2013 International Preliminary Report on Patentability issued in International Patent Application No. PCT/JP2011/005666 (with translation).

(Continued)

*Primary Examiner* — Frederick Parker
(74) *Attorney, Agent, or Firm* — Oliff PLC

(57) ABSTRACT

A tire printing device includes a printer head (2), positioned near a rotating tire (1), that ejects and applies coating material, an unevenness detection sensor (3) that detects a predetermined raised/recessed character on the surface of the rotating tire (1) and a PC (10) that sets the origin of rotation of the tire (1) based on a signal detected by the unevenness detection sensor (3) and synchronizes the operation start time of the printer head (2) with the origin of rotation in order to maintain a constant relationship between the position of the raised/recessed character and the position of application of the coating material. Desired printing is performed by the printer head (2) ejecting and applying the coating material onto a surface of the rotating tire (1) after the rotating tire is mounted on a rim and inflated to a regular shape by being applied with an internal pressure.

7 Claims, 4 Drawing Sheets

(56) References Cited

FOREIGN PATENT DOCUMENTS

| JP | A 2007-83511 | 4/2007 |
| JP | A 2007-516103 | 6/2007 |
| JP | A 2008-56055 | 3/2008 |
| JP | A 2008-241597 | 10/2008 |
| JP | A 2010-32248 | 2/2010 |
| JP | A 2010-125440 | 6/2010 |

OTHER PUBLICATIONS

Dec. 27, 2011 Written Opinion of the International Searching Authority issued in International Patent Application No. PCT/JP2011/005666 (with translation).

Jun. 19, 2012 Decision of Final Rejection issued in Japanese Patent Application No. JP 2012-086579 (with translation).

Jan. 15, 2013 Trial Decision, Appeal No. 2012-17389, issued in Japanese Patent Application No. 2012-86579 (with translation).

Dec. 27, 2011 Search Report issued in International Patent Application No. PCT/JP2011/005666.

May 20, 2014 Office Action issued in Japanese Patent Application No. 2012-114878 (with translation).

* cited by examiner

TIRE SURFACE PRINTING METHOD AND TIRE PRINTING DEVICE

TECHNICAL FIELD

The present invention relates to a tire surface printing method and a tire printing device that print information such as characters, marks or the like on automobile tires.

BACKGROUND ART

Conventionally, in order to display information such as characters, marks or the like on automobile tires, a method that engraves tires is used. In other words, with a conventional method, a patterned mold is manufactured by forming a pattern for the display information within the mold used to vulcanize a tire. A raw tire is then loaded into the patterned mold to engrave the display information on the tire surface by pressure.

Patterned molds, however, lack versatility and must be manufactured for each set of display information. A proposal has thus been made to manufacture a display seal bearing information, such as characters, marks or the like, and to attach the display seal to a predetermined position on the tire during vulcanizing (for example, see Patent Literature 1). This increases the versatility of the mold and contributes to an increase in tire productivity.

CITATION LIST

Patent Literature

PTL 1: JP2008056055A

SUMMARY OF INVENTION

However, since it is difficult to attach the above display seal automatically to a specific position on a raw tire, the display seal is typically attached by hand, leading to problems with the accuracy of the attachment position and with productivity. Furthermore, it is difficult to attach the display seal to the curved surface of the tire sidewall without any wrinkles and without applying an internal pressure to the tire. Moreover, when attaching the display seal, a foreign object might adhere to the tire sidewall and become the cause of a crack. The display seal could thus degrade tire performance.

The present invention has been conceived in light of the above problems, and it is an object thereof to provide a tire surface printing method and a tire printing device that print characters, marks or the like on a tire sidewall at an accurate position while maintaining productivity, without causing wrinkles or degrading tire performance.

In order to achieve the above object, a tire surface printing method of the present invention comprises the steps of: mounting a vulcanized tire on a rim; applying an internal pressure to the tire mounted on the rim; and performing desired printing by a printer head ejecting and applying coating material onto a surface of the tire applied with the internal pressure.

The mounting on the rim is preferably performed automatically. The desired printing is preferably performed by ejecting and applying the coating material onto the surface of the tire while rotating the tire, and the desired printing is preferably performed by ejecting and applying the coating material onto the surface of the tire after inflating the tire to a regular shape by applying the internal pressure to the tire.

The tire surface printing method preferably further comprises detecting, with an external sensor, a specific raised/recessed character on the surface of the tire while the tire rotates, setting an origin of rotation of the tire, and synchronizing an operation start time of the printer head with the origin of rotation so as to maintain a constant relationship between a position of the raised/recessed character and a position of application of the coating material.

The printer head that performs the desired printing by ejecting and applying the coating material is preferably one of an inkjet type, an air spray type and an airless spray type.

The tire surface printing method preferably further comprises drying and hardening the coating material ejected by the printer head with one of a UV lamp and a hot air device, and the one of the UV lamp and the hot air device is preferably positioned adjacent to the printer head.

The tire surface printing method preferably further comprises detecting, with an encoder connected to a rotation shaft of the tire, an amount of rotation of the tire and transmitting, to a device that controls the printer head, the detected amount of rotation as a signal in order to synchronize the operation start time with the origin of rotation of the printer head.

The desired printing is preferably performed by preparing a number of printer heads corresponding to a number of colors for coating and performing multicolor printing by simultaneous rotation.

A tire printing device of the present invention comprises a printer head, positioned near a rotating tire, that ejects and applies coating material; a sensor that detects a specific raised/recessed character on a surface of the rotating tire; and a control device that performs control to maintain a constant relationship between a position of the raised/recessed character and a position of application of the coating material by setting an origin of rotation of the tire based on a signal detected by the sensor and synchronizing an operation start time of the printer head with the origin of rotation, wherein the tire printing device performs desired printing by the printer head ejecting and applying the coating material onto a surface of the rotating tire, the rotating tire having been mounted on a rim and inflated to a regular shape by being applied with an internal pressure.

A tire of the present invention is a tire on which a predetermined pattern is printed with the above tire surface printing method, wherein the predetermined pattern is drawn so as to maintain a constant relationship with a position of a predetermined raised/recessed character.

By allowing for automatic printing of characters, marks or the like at a specific position on the tire sidewall, the present invention ensures printing position accuracy and productivity during all automated operations.

By printing on a tire inflated to the internal pressure, the present invention also allows for the printing of characters, marks or the like on the curved surface of the tire sidewall without any wrinkles.

Furthermore, by not causing foreign objects to adhere to the tire sidewall, the present invention prevents foreign objects from possibly causing cracks and degrading tire performance.

BRIEF DESCRIPTION OF DRAWINGS

The present invention will be further described below with reference to the accompanying drawings, wherein.

REFERENCE SIGNS LIST

Figure 1:
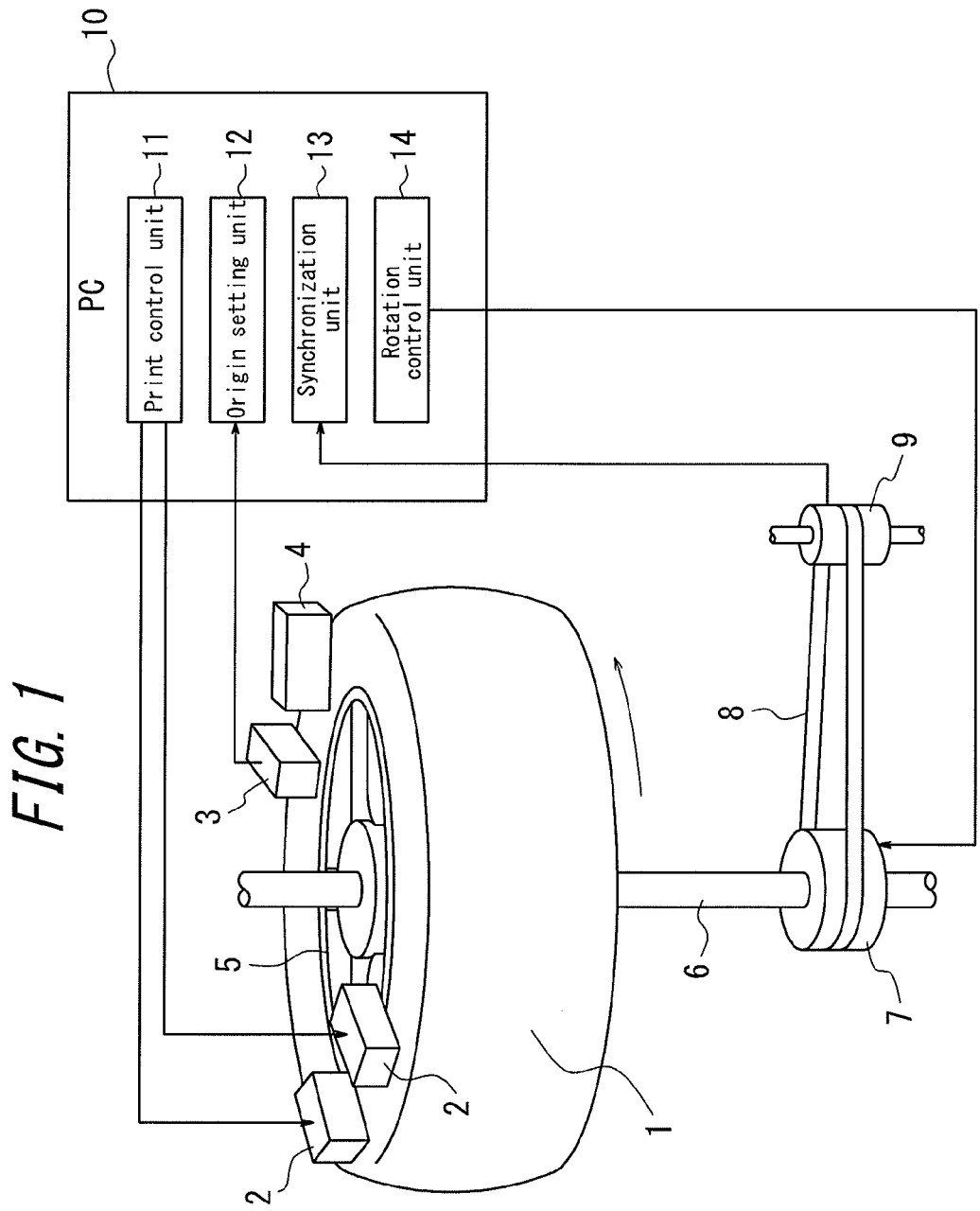
FIG. 1 is a schematic diagram of a printing device that implements the tire surface printing method according to the present embodiment.

1: Tire
2: Printer head
3: Unevenness detection sensor
4: UV lamp
5: Tire wheel
6: Tire rotation shaft
7: Rotation shaft driving device
8: Belt
9: Rotary encoder
10: PC
11: Printing control unit
12: Origin setting unit
13: Synchronization unit
14: Rotation control unit
15: Raised/recessed character
16: Printed character

DESCRIPTION OF EMBODIMENTS

The following describes an embodiment of the present invention with reference to the drawings. FIG. 1 is a schematic diagram of a tire printing device that implements the tire surface printing method according to the present embodiment.

An inkjet type printer head 2, an unevenness detection sensor 3 and an ultraviolet (UV) lamp 4 are disposed near the sidewall of a tire 1 that has been mounted on a rim and inflated to a regular shape by being applied with an internal pressure. The printer head 2 prints desired characters, marks, symbols, designs or the like (i.e. a predetermined pattern) on the tire sidewall. The unevenness detection sensor 3 detects, from outside a rotating tire, a specific raised/recessed character on the surface of the tire. The UV lamp 4 is positioned adjacent to the printer head 2 and dries and hardens coating material that is applied on the tire sidewall by the printer head 2.

Note that instead of using an inkjet type printer head 2, an air spray type, an airless spray type or the like may be used. Furthermore, when performing multicolor printing by simultaneous rotation, a plurality of printer heads may be disposed in accordance with the number of colors for coating. A laser displacement gauge or the like is used in the unevenness detection sensor 3. While the ultraviolet lamp 4 is used above for drying and hardening of the coating material, a hot air device may be used instead.

A tire rotation shaft 6 passes through a center hole in a tire wheel 5 and is driven by a rotation shaft driving device 7. Rotation of the tire rotation shaft 6 causes the tire 1 to rotate (counterclockwise). A rotary encoder 9 is connected to the rotation shaft driving device 7 via a belt 8 in order to synchronize the operation start time of the printer head 2 with the origin of rotation of the tire 1. The rotary encoder 9 detects the amount of rotation of the tire 1 and transmits the detected amount of rotation to a personal computer (PC) 10, which is a control device, as a signal (pulse signal).

The PC 10 is provided with a print control unit 11, an origin setting unit 12, a synchronization unit 13 and a rotation control unit 14. The print control unit 11 is connected to the printer head 2 and outputs a print control signal and a print data signal to the printer head 2. The origin setting unit 12 is connected to the unevenness detection sensor 3 and compares data on an unevenness pattern of raised/recessed characters detected by the unevenness detection sensor 3 with data on an unevenness pattern stored in advance in the PC 10. If these pieces of data match, the origin setting unit 12 sets a specific raised/recessed character in the unevenness pattern as the origin of tire rotation. The synchronization unit 13 is connected to the rotary encoder 9, detects a signal from the rotary encoder 9, and synchronizes the operation start time of the printer head 2 with the origin of tire rotation at a predetermined time. By synchronizing the operation start time of the printer head 2 with the origin of tire rotation at a predetermined time, the synchronization unit 13 maintains a constant relationship between the printing position and the position of raised/recessed characters formed every time in the tire mold. The rotation control unit 14 is connected to the rotation shaft driving device 7 and controls the rotation shaft driving device 7 so that the tire 1 rotates at a constant speed.

Note that the functions of the print control unit 11, origin setting unit 12, synchronization unit 13 and rotation control unit 14 are achieved by execution of software (a program) stored on the PC 10.

Figure 2:
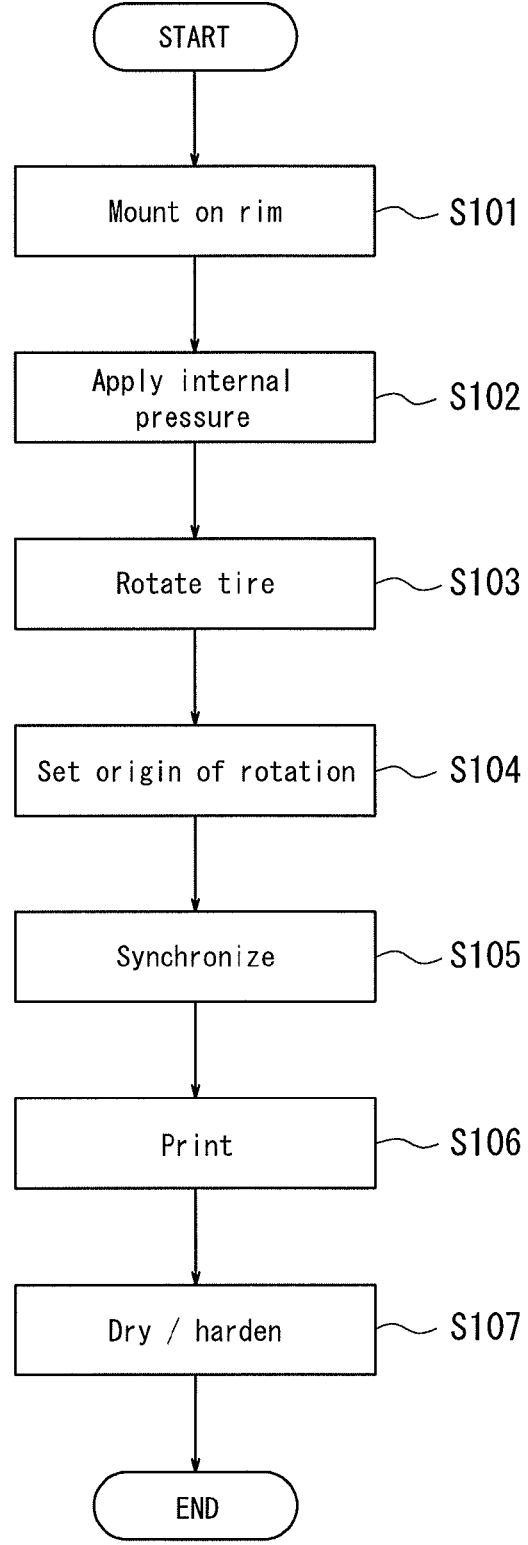
FIG. 2 is a flowchart describing the tire surface printing method of the present invention.

Next, operations of the tire surface printing method of the present invention are described with reference to the flowchart in FIG. 2. First, a vulcanized tire is automatically mounted on a rim (S101), and the rim-mounted tire is inflated to a regular shape by being applied with an internal pressure (S102). As shown in FIG. 1, the inflated tire 1 is mounted onto the tire printing device of the present invention by passing the tire rotation shaft 6 through the center hole in the tire wheel 5, and the rotation shaft driving device 7 then drives the tire rotation shaft 6 to rotate the tire 1 (S103). Next, when the unevenness detection sensor 3 detects, from outside the rotating tire 1, a specific raised/recessed character formed on the surface of the tire 1 by the tire mold, the origin setting unit 12 sets the specific raised/recessed character detected by the unevenness detection sensor 3 as the origin of rotation (S104). The rotary encoder 9 connected to the tire rotation shaft 6 then detects the amount of rotation of the tire 1 and transmits the amount of rotation from the origin of rotation of the tire 1 to the synchronization unit 13 as a signal (pulse signal), at which point the synchronization unit 13 synchronizes the operation start time of the printer head 2 with the origin of rotation of the tire 1 (S105). While maintaining a constant relationship between the printing position and the position of the specific raised/recessed character, the printer head 2 ejects coating material and applies the coating material to the sidewall of the rotating tire 1, thus drawing (printing) desired characters, marks, symbols, designs or the like (i.e. a predetermined pattern; S106). Next, the adjacently positioned ultraviolet lamp 4 dries and hardens the applied coating material (S107).

Figure 3:
FIG. 3 shows an example of an output image printed by a printer head.
Figure 4:
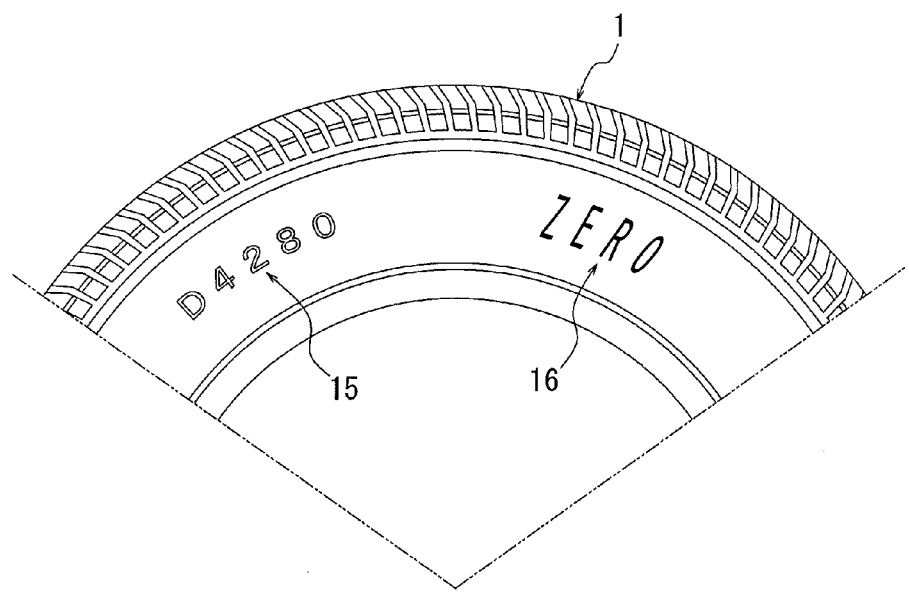
FIG. 4 shows raised/recessed characters and the printed output image on a tire sidewall.

FIG. 3 shows an example of an output image printed by the printer head, and FIG. 4 shows raised/recessed characters formed on the tire sidewall and the printed output image printed on the tire sidewall. Raised/recessed characters 15 "D4280" are formed on the sidewall of the tire 1, and a certain distance from these raised/recessed characters 15, characters 16 "ZERO" are printed.

Figure 5:
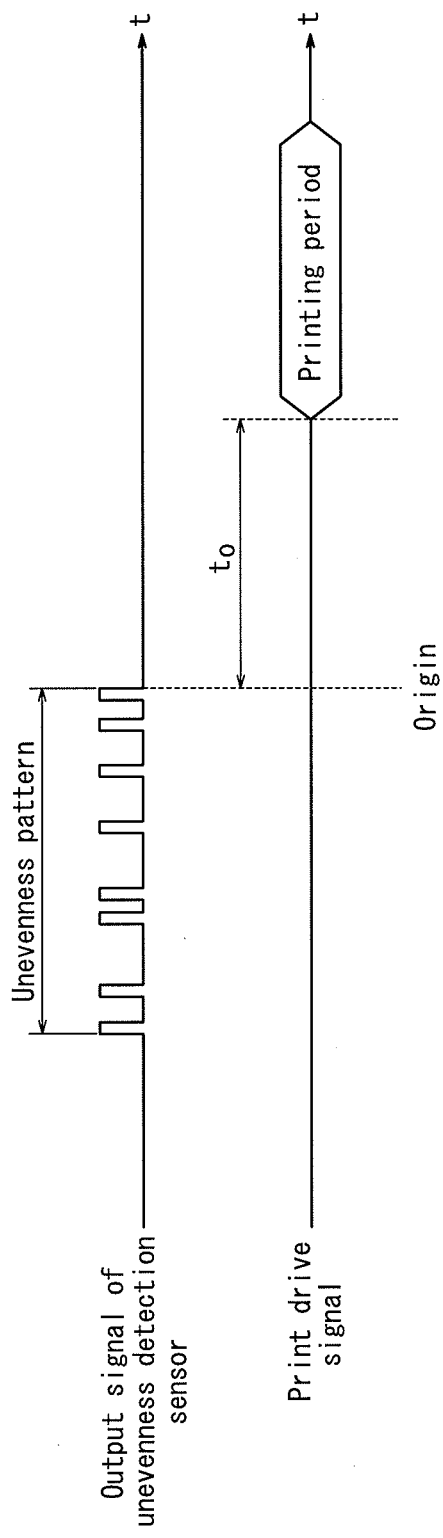
FIG. 5 is a timing flowchart of an output signal from an unevenness detection sensor and a print control signal that is output to the printer head.

FIG. 5 is a timing flowchart of an output signal from the unevenness detection sensor and a print control signal that is output to the printer head.

The origin setting unit 12 compares data on an unevenness pattern of the raised/recessed characters "D4280" detected by the unevenness detection sensor 3 with data on an unevenness pattern of the raised/recessed characters "D4280" stored in advance in the PC 10. If these pieces of data match, the origin setting unit 12 sets the last character in "D4280", i.e. "0", as the specific raised/recessed character that becomes the origin of tire rotation. The synchronization unit 13 counts the number of pulses generated by the rotary encoder 9 and, at a time $t_0$, synchronizes the operation start time of the printer head 2 with the time at which the origin of tire rotation passes by. The print control unit 11 outputs the print control signal and the print data signal for the characters "ZERO" to the printer head 2. The printer head 2 prints the characters 16 "ZERO" on the tire sidewall.

As described above, by allowing for automatic printing of characters, marks or the like at a specific position on the tire sidewall, the present invention allows for increased printing position accuracy and productivity. By printing on a tire mounted on a rim and inflated to the internal pressure, the present invention also allows for the printing of characters, marks or the like on the curved surface of the tire sidewall without any wrinkles. Furthermore, by not causing foreign objects to adhere to the tire sidewall, the present invention allows for prevention of cracks caused by foreign objects and consequent degradation in tire performance.

The invention claimed is:

1. A tire surface printing method, the tire surface printing method comprising the steps of:
    mounting a vulcanized tire on a rim;
    inflating the tire mounted on the rim;
    positioning the tire horizontally so that a rotation shaft traversing a center of the tire is perpendicular; and
    performing desired multicolor printing with a selected head that is selected from any one of an inkjet printer head, an air spray head, and an airless spray head that ejects and applies coating material onto a same radial position of a sidewall of the tire as raised/recessed characters provided on the sidewall by:
        rotating the tire at a constant velocity by driving the rotation shaft with a rotation driving device so that the tire rotates along with the rotation shaft;
        applying the desired multicolor printing by the selected head ejecting and applying the coating material onto the sidewall of the rotating tire;
        drying and hardening the coating material ejected by the selected head with a means for drying and hardening; and
        detecting, with an external sensor, a specific raised/recessed character on the surface of the tire while the tire rotates, setting an origin of rotation of the tire, and synchronizing an operation start time of the selected head with the origin of rotation so as to maintain a constant relationship between a position of the specific raised/recessed character and a position of application of the coating material.

2. The tire surface printing method of claim 1, wherein the desired printing includes a character.

3. The tire surface printing method of claim 1, wherein the desired printing is performed at a different position than a position of the raised/recessed character.

4. The tire surface printing method of claim 1, further comprising:
    detecting the raised/recessed characters with an unevenness detection sensor.

5. The tire surface printing method of claim 4, wherein in the step of performing the desired printing, an origin of tire rotation is set to a position at which any of the raised/recessed characters is detected.

6. The tire surface printing method of claim 1, wherein the tire is automatically mounted on the rim.

7. The tire surface printing method of claim 1, wherein the desired printing is performed by preparing a number of the selected heads corresponding to a number of colors for coating and performing simultaneous multicolor printing when the tire rotates.

* * * * *